US006957252B1

(12) United States Patent
Bui et al.

(10) Patent No.: US 6,957,252 B1
(45) Date of Patent: Oct. 18, 2005

(54) METHOD OF SYNCHRONIZING MULTIPLE NETWORKS USING PERMANENT ADDRESSING SCHEME

(75) Inventors: Tam D. Bui, Austin, TX (US); Chetan Mehta, Austin, TX (US); Keng-Hiup Ng, Kuala Lumpur (MY); Jayeshkumar M. Patel, Ausitn, TX (US); Amir Simon, Austin, TX (US); Kiet Anh Tran, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 874 days.

(21) Appl. No.: 09/687,099

(22) Filed: Oct. 12, 2000

(51) Int. Cl.[7] .............................................. G06F 15/16
(52) U.S. Cl. ..................................... 709/220; 709/221
(58) Field of Search ................................ 709/221, 245, 709/248, 220, 228; 710/9

(56) References Cited

U.S. PATENT DOCUMENTS 5,917,997 A * 6/1999 Bell et al. ...................... 714/4
5,974,562 A * 10/1999 Townsend et al. .............. 714/4
6,128,664 A * 10/2000 Yanagidate et al. .......... 709/228

OTHER PUBLICATIONS

Http://www.rs6000.ibm.com/resource/hardware_docs/syss-4/a4am3b06.html, *Installation and Service Guide*, Sep. 14, 2000.

* cited by examiner

Primary Examiner—Ario Etienne
Assistant Examiner—Barbara Burgess
(74) Attorney, Agent, or Firm—Duke W. Yee; Mark E. McBurney; Wayne P. Bailey

(57) ABSTRACT

A method, system, and apparatus for synchronizing device, node, and drawer addresses between two networks within a data processing system is provided. In one embodiment, a service processor assigns a plurality of SPCN addresses to each of a plurality of devices in the data processing system. System firmware then determines the RIO addresses corresponding to the plurality of devices. If one of the SPCN addresses is not the same as the RIO address for the corresponding device, node, or drawer, then the service processor reassigns a new SPCN address to the corresponding device, node, or drawer such that the new SPCN address is identical to the RIO address for a corresponding device, node, or drawer.

24 Claims, 2 Drawing Sheets

METHOD OF SYNCHRONIZING MULTIPLE NETWORKS USING PERMANENT ADDRESSING SCHEME

BACKGROUND OF THE INVENTION

1. Technical Field:

The present invention relates to the field of computer software and, more particular, to management of devices, node, and/or expansion tower addresses within a data processing system.

2. Description of Related Art:

Many computers that are used as servers, such as, for example, as a server to host web pages, are multi-processor, multi-bus systems. These computers are capable of handling several tasks at once and performing each task very rapidly. These computers may also contain numerous input and output devices which are contained in input/output (I/O) drawers. Each I/O drawer may contain, for example, up to 14 PCI adapters to allow devices, such as, for example, CDROMS, disk drives, and network adapters, to be connected to the computer.

These I/O drawers are typically physically separated from the processors and memory components of the computer and are powered from a separate power supply. The I/O drawers and their components are connected to the main computer using varying types of cables, such as, for example, system power control network (SPCN) cables and remote input/output (RIO) network cables which allow the I/O devices contained within the I/O drawers to function with the remainder of the computer as if they were on the system bus even if these devices are up to approximately fifteen feet away from the main computer.

One problem with using two or more physical networks, such as the SPCN and RIO networks mentioned above, is that each network assigns its own unique address to each I/O drawer. This may not seem like a major problem on the surface, but, when an error occurs, it becomes difficult for a user to identify the correct drawer(s) and/or device(s) for replacement without physically checking the RIO network connection or the SPCN network connection. Since, many of computers of this type may contain hundreds of I/O devices, finding the offending drawer(s) and/or device(s) in this manner can become quite time consuming and tedious. Therefore, it would be desirable to have a method and system for synchronizing the two different physical network addresses such that the SPCN network and the RIO network use identical addresses to identify the same I/O drawer or node and also, the devices in that drawer.

SUMMARY OF THE INVENTION

The present invention provides, a method, system, and apparatus for synchronizing device, node, and drawer addresses between two networks within a data processing system. In one embodiment, a service processor assigns a plurality of SPCN addresses to each of a plurality of devices in the data processing system. System firmware then determines the RIO addresses corresponding to the plurality of devices. If one of the SPCN addresses is not the same as the RIO address for the corresponding device, node, or drawer, then the service processor reassigns a new SPCN address to the corresponding device, node, or drawer such that the new SPCN address is identical to the RIO address for a corresponding device, node, or drawer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
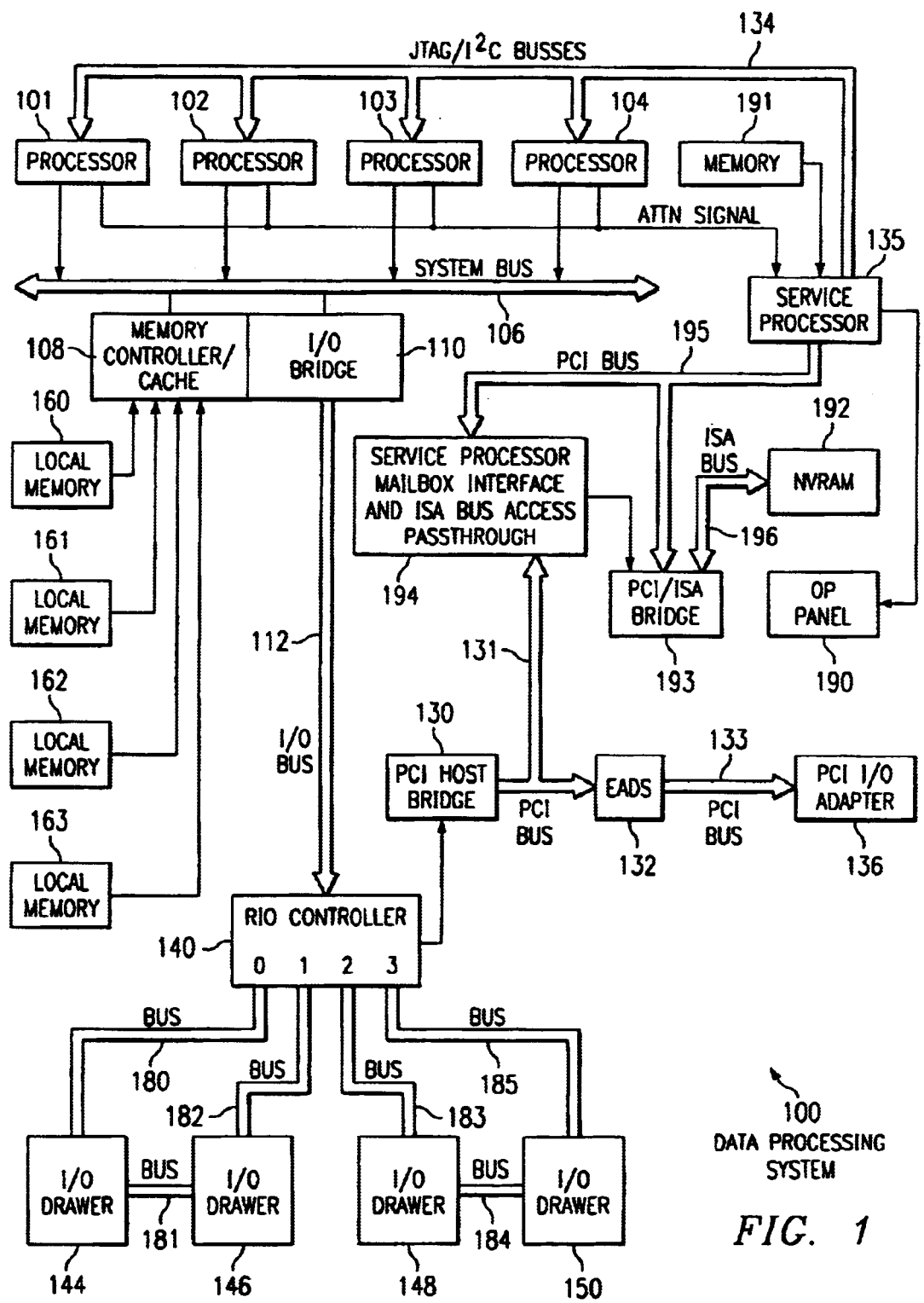
FIG. 1 depicts a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

An RIO Controller 140 provides an interface between processors 101–104 and local memories 160–163 with I/O drawers 144–150. I/O drawers 144–150 collectively comprise an expansion tower. I/O drawers 144–150 are powered independently from the rest of the data processing system containing the processors 201–204 and memory 160–163. Connection between the I/O drawers 144–150 and RIO Controller is made through buses 180–185 as depicted which consist of cables including System Power Control Network (SPCN), Remote Input Output (RIO) cables, JTAG buses, and operator panel cables. Bus 180 provides a connection between node 0 of RIO Controller 140 and I/O drawer 144 which is in turn connected to I/O Drawer 146 through bus 181. A return bus 182 connects I/O Drawer 146 to node 1 of RIO Controller 140. Similarly, buses 183–185 are used to connect I/O drawer 148 and 150 to nodes 2 and 3 of RIO Controller 140. Each I/O Drawer 144–150 holds up to 14 PCI I/O adapters. Four succinct PCI buses are present in each of I/O drawers 144–150. Each of I/O drawers 144–150 provides space for up to four media devices, such as, for example, tape drives, CDROM drives, and diskette drives, and two DASD bays each holding up to six disk drives.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. The ISA bus access pass-through logic 194 forwards PCI accesses destined to the PCI/ISA bridge 193. The NV-RAM storage is connected to the ISA bus 196. The Service processor 135 is coupled to the service processor mailbox interface 194 through its local PCI bus 195. Service processor 135 is also connected to processors 101–104 via a plurality of JTAG/I²C buses 134. JTAG/I²C buses 134 are a combination of JTAG/scan busses (see IEEE 1149.1) and Phillips I²C busses. However, alternatively, JTAG/I²C buses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
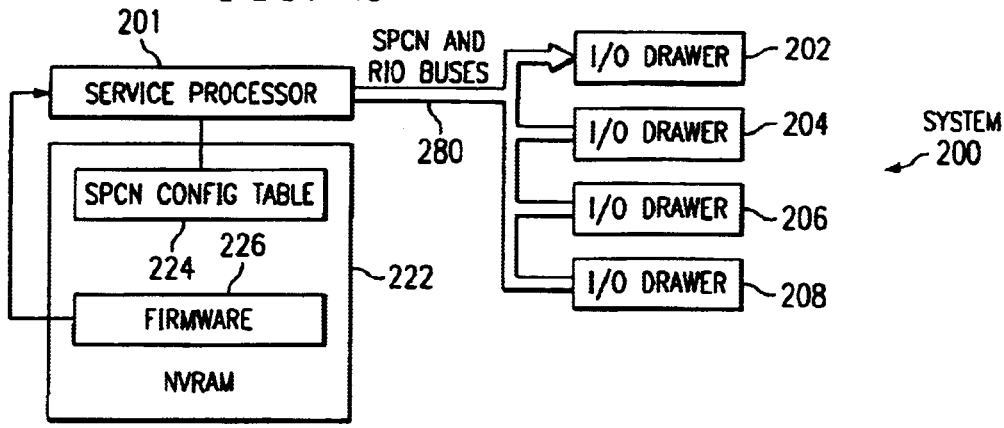
FIG. 2 depicts a block diagram of a system for managing a system I/O drawers connected to multiple networks in accordance with the present invention.

With reference now to FIG. 2, a block diagram of a system for managing a system I/O drawers connected to multiple networks is depicted in accordance with the present invention. System 200 may be implemented within a data processing system such as, for example, data processing system 100 in FIG. 1. As discussed above, a system I/O drawer is a modular component for inserting I/O expansion slots into a data processing system. An I/O drawer physically packages several PCI Host Bridges (PHBs) to provide PCI I/O slots for plug-in I/O adapters. System 200 includes four I/O drawers 202–208, such as, for example, I/O drawers 144–150 in FIG. 1. However, although depicted with four I/O drawers 202–208, one skilled in the art will recognize that more or fewer I/O drawers may be included than depicted in FIG. 2. It should also be noted that some of I/O drawers 202–208 may be connected to service processor 201 through RIO networks only, through SPCN buses only, or through both. The RIO Controller through which I/O drawers 202–208 would be connected to service processor 201 is not shown for clarity. Also not shown are the various connections between I/O drawers 202–208 with each other.

During the boot process, service processor 201, which may be implemented, for example, as service processor 135 in FIG. 1, assigns a unique SPCN ID to each of I/O drawers 202–208 within the system 200 and write this SPCN ID to SPCN config Table 224 in NVRAM 222. Service processor 201 uses the SPCN portion of SPCN & RIO buses 280 to detect and assign unique IDs to I/O drawers 202–208, to control the power logic of the I/O drawers 202–208, and to monitor their environmental sensors such as drawer temperature, fan speed, etc. NVRAM 222 may be implemented as, for example, NVRAM 192 in FIG. 1.

Once the SPCN addresses have been created and written to SPCN config table 224, the boot process continues and system firmware 226 reads the SPCN config table 224 information from NVRAM 222. The system firmware 226 then collects the RIO network address for each of I/O drawers 202–208 connected via the RIO network. Firmware 226 will then fill up SPCN Config Table 224 with the RIO network drawer addresses and write the modified SPCN config table to NVRAM 222. If any drawer address in SPCN config table does not match a respective RIO drawer address, firmware 226 sends mailbox to service processor 201 to assign a new drawer address to any drawer address in the SPCN config table 224 that doe not match with a respective RIO drawer address. Service processor 201 will then assign a new permanent SPCN drawer address to those drawers having an RIO drawer address that does not match the SPCN drawer address. After this point, both networks will identify the same drawer or node with the same address or location.

Those of ordinary skill in the art will appreciate that the components depicted in FIG. 2 may vary. For example, more or fewer I/O drawers may be utilized than depicted. The depicted example is not meant to imply architectural limitations with respect to the present invention.

Figure 3:
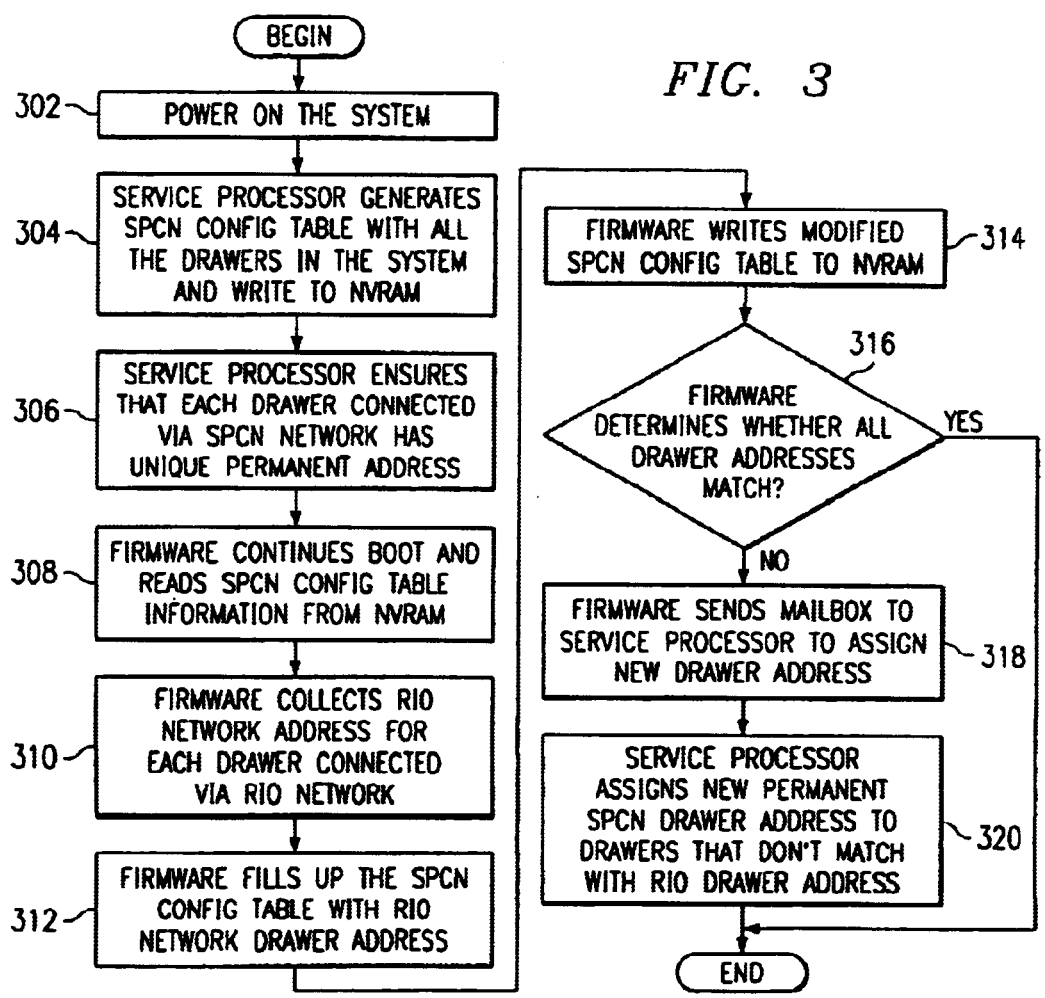
FIG. 3 depicts a flowchart illustrating an exemplary method of synchronizing addresses for multiple physical networks in accordance with the present invention.

With reference now to FIG. 3, a flowchart illustrating an exemplary method of synchronizing addresses for multiple physical networks is depicted in accordance with the present invention. Once the system is powered on (step 302), the service processor generates an SPCN configuration table with all the drawers in the system and writes it to the non-volatile random access memory (NVRAM) (step 304). The service processor ensures that each drawer connected via the SPCN network has a unique permanent address (step 306). The data processing system then continues with the system initialization (boot) and system firmware reads the SPCN configuration table information from NVRAM (step 308).

System firmware then collects all of the RIO network addresses for each drawer connected via the RIO network (step 310) and fills up the SPCN configuration table with RIO network drawer addresses (step 312). The firmware then writes the modified SPCN config table to NVRAM (step 314). Next, it is determined whether all I/O drawer addresses match (step 316). If all drawer addresses match between the SPCN network and the RIO network, then the process is completed. If, however, all of the addresses do not match, then the firmware sends a mailbox to the service processor to assign a new drawer address to those I/O drawers whose SPCN address did not match the RIO address (step 318). The service processor then assigns a new permanent SPCN drawer address to the appropriate drawers such that the SPCN address and the RIO address for the corresponding I/O drawer are identical (step 320).

It should be noted that although the present invention has been described primarily with reference to matching addresses for I/O drawers for SPCN and RIO networks, other networks of drawers with two systems accessing the same drawers could be utilized as well. Also, while described primarily with reference to a single expansion tower with four I/O drawers, more or fewer expansion towers and/or I/O drawers may be utilized than described herein.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of synchronizing device addresses between two networks within a data processing system, the method comprising:

coupling a plurality of devices together utilizing a first network coupled to a first port of each of the plurality of devices and concurrently coupling said plurality of devices together utilizing a second network coupled to a second port of each of the plurality of devices, said first network being separate from said second network;

accessing said plurality of devices utilizing said first and said second networks concurrently;

assigning a plurality of first unique addresses to each of said plurality of devices for said first network;

determining a plurality of second unique addresses assigned to each of the plurality of devices for said second network; and responsive to a determination that one of the plurality of first unique addresses is not identical to one of the plurality of second unique addresses for one of the plurality of devices, reassigning a new unique address to the one of the plurality of devices for the first network such that the new unique address is used to access the one of the plurality of devices by the first network and is identical to the one of the plurality of second unique addresses that is used to access the one of the plurality of devices by the second network.

2. The method as recited in claim 1, wherein the device is an input/output drawer.

3. The method as recited in claim 1, wherein the device is expansion tower.

4. The method as recited in claim 1, wherein the first unique address corresponds to an SPCN system address.

5. The method as recited in claim 1, wherein the second unique address corresponds to an RIO system address.

6. The method as recited in claim 1, wherein the device is a CD-ROM drive.

7. The method as recited in claim 1, wherein the device is a DVD ROM drive.

8. The method as recited in claim 1, wherein the device is a hard drive.

9. A computer program product in a computer readable media for use in a data processing system for synchronizing device addresses between two networks within a data processing system, said plurality of devices coupled together utilizing a first network coupled to a first port of each of the plurality of devices and concurrently coupled together utilizing a second network coupled to a second port of each of the plurality of devices, said first network being separate from said second network, the computer program product comprising:

instructions for accessing said plurality of devices utilizing said first and said second networks concurrently;

instructions for assigning a plurality of first unique addresses to each of said plurality of devices for said first network;

instructions for determining a plurality of second unique addresses assigned to each of the plurality of devices for said second network; and instructions, responsive to a determination that one of the plurality of first unique addresses is not identical to one of the plurality of second unique addresses for one of the plurality of devices, for reassigning a new unique address to the one of the plurality of devices for the first network such that the new unique address is used to access the one of the plurality of devices by the first network and is identical to the corresponding one of the plurality of second unique addresses that is used to access the one of the plurality of devices by the second network.

10. The computer program product as recited in claim 9, wherein the device is an input/output drawer.

11. The computer program product as recited in claim 9, wherein the device is expansion tower.

12. The computer program product as recited in claim 9, wherein the first unique address corresponds to an SPCN system address.

13. The computer program product as recited in claim 9, wherein the second unique address corresponds to an RIO system address.

14. The computer program product as recited in claim 9, wherein the device is a CD-ROM drive.

15. The computer program product as recited in claim 9, wherein the device is a DVD ROM drive.

16. The computer program product as recited in claim 9, wherein the device is a hard drive.

17. A system for synchronizing device addresses between two networks within a data processing system, the system comprising:

said plurality of devices coupled together utilizing a first network coupled to a first port of each of the plurality of devices and concurrently coupled together utilizing a second network coupled to a second port of each of the plurality of devices, said first network being separate from said second network;

said first and said second networks utilized to access said plurality of devices concurrently;

first means for assigning a plurality of first unique addresses to each of said plurality of devices for said first network;

second means for determining a plurality of second unique addresses assigned to each of the plurality of devices for said second network; and third means, responsive to a determination that one of the plurality of first unique addresses is not identical to a one of the plurality of second unique addresses for one of said plurality of devices, for reassigning a new unique address to the one of the plurality of devices for the first network such that the new unique address is used to access the one of the plurality of devices by the first network and is identical to the corresponding one of the plurality of second unique addresses that is used to access the one of the plurality of devices by the second network.

18. The system as recited in claim 17, wherein the device is an input/output drawer.

19. The system as recited in claim 17, wherein the device is expansion tower.

20. The system as recited in claim 17, wherein the first unique address corresponds to an SPCN system address.

21. The system as recited in claim 17, wherein the second unique address corresponds to an RIO system address.

22. The system as recited in claim 17, wherein the device is a CD-ROM drive.

23. The system as recited in claim 17, wherein the device is a DVD ROM drive.

24. The system as recited in claim 17, wherein the device is a hard drive.

* * * * *